United States Patent
Chokshi (10) Patent No.: US 9,890,659 B2
(45) Date of Patent: Feb. 13, 2018

(54) MID-TURBINE FRAME VANE ASSEMBLY SUPPORT WITH RETENTION UNIT

(71) Applicant: United Technologies Corporation, Hartford, CT (US)

(72) Inventor: Jaisukhlal V. Chokshi, Palm Beach Gardens, FL (US)

(73) Assignee: United Technologies Corporation, Farmington, CT (US)

( * ) Notice: Subject to any disclaimer, the term of this patent is extended or adjusted under 35 U.S.C. 154(b) by 1032 days.

(21) Appl. No.: 14/170,770

(22) Filed: Feb. 3, 2014

(65) Prior Publication Data

US 2014/0227078 A1  Aug. 14, 2014

Related U.S. Application Data (60) Provisional application No. 61/763,092, filed on Feb. 11, 2013.

(51) Int. Cl.
*F01D 25/24* (2006.01)
*F01D 9/06* (2006.01)
*F01D 25/16* (2006.01)
*F02C 7/20* (2006.01)

(52) U.S. Cl.
CPC .......... *F01D 25/246* (2013.01); *F01D 9/065* (2013.01); *F01D 25/162* (2013.01); *F02C 7/20* (2013.01)

(58) Field of Classification Search
CPC ...... F01D 25/246; F01D 25/162; F01D 9/065; F01D 9/06; F01D 25/00; F01D 25/24; F01D 25/243; F01D 25/26; F01D 25/28; F02C 7/20; F05D 2240/14

See application file for complete search history.

(56) References Cited

U.S. PATENT DOCUMENTS

| | | | |
|---|---|---|---|
| 2,869,941 A * | 1/1959 | Shoup, Jr. | F01D 25/164 384/581 |
| 4,478,551 A * | 10/1984 | Honeycutt, Jr. | F01D 25/162 415/139 |
| 5,160,251 A * | 11/1992 | Ciokajlo | F01D 25/162 415/142 |
| 7,594,405 B2 | 9/2009 | Somanath et al. | |
| 7,775,049 B2 | 8/2010 | Kumar et al. | |
| 8,061,969 B2 | 11/2011 | Durocher et al. | |
| 8,099,962 B2 | 1/2012 | Durocher et al. | |
| 8,245,518 B2 | 8/2012 | Durocher et al. | |
| 2007/0237635 A1 | 10/2007 | Nagendra et al. | |
| 2008/0022692 A1 | 1/2008 | Nagendra et al. | |

* cited by examiner

*Primary Examiner* — Gregory Anderson
*Assistant Examiner* — Danielle M Christensen
(74) *Attorney, Agent, or Firm* — Carlson, Gaskey & Olds, P.C.

(57) ABSTRACT

A mid-turbine frame for a gas turbine engine includes a vane assembly supported within a case. The vane assembly directs airflow between a first turbine and a second turbine. A support rod extends through the vane assembly and is secured to the case by a retaining nut. The retaining nut extends through a guide attached to the vane assembly for aligning the vane assembly relative to the case portion.

10 Claims, 6 Drawing Sheets

MID-TURBINE FRAME VANE ASSEMBLY SUPPORT WITH RETENTION UNIT

CROSS-REFERENCE TO RELATED APPLICATION

This application claims priority to U.S. Provisional Application 61/763,092 filed Feb. 11, 2013.

BACKGROUND

A gas turbine engine typically includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

In some engine configurations, a mid-turbine frame including a vane assembly is supported between the high pressure turbine and the low pressure turbine. The vane assembly orientates core airflow between the high pressure turbine and the low pressure turbine. The vane assembly is supported within a case by a plurality of centering pins. Each of the centering pins is attached to a boss defined on the case by threaded fasteners. Each part and fastener in a gas turbine engine increases cost and assembly complexity.

Accordingly, it is desirable to develop and design engine structures that provide the desired features and function while minimizing cost and assembly complexity.

SUMMARY

A gas turbine engine assembly according to an exemplary embodiment of this disclosure, among other possible things includes an engine case, a first turbine supported for rotation about an engine axis, a second turbine spaced axially apart from the first turbine and rotatable about the engine axis, a vane assembly supported within the engine case between the first turbine and the second turbine, a support extending through the vane assembly, a retention nut attached to the support and secured to the engine case, and a guide engaged to the retention nut for restraining the vane assembly relative to the engine case.

In a further embodiment of the foregoing gas turbine engine assembly, the guide includes a bore and a portion of the retention nut is received within the bore.

In a further embodiment of any of the foregoing gas turbine engine assemblies, the retention nut includes an outer surface that guides along an inner surface of the bore.

In a further embodiment of any of the foregoing gas turbine engine assemblies, the retention nut includes a flange secured to an outer surface of the engine case with a threaded fastener. A cylindrical portion extends from the flange with the cylindrical portion received within the bore of the guide.

In a further embodiment of any of the foregoing gas turbine engine assemblies, includes a cavity extending through the vane assembly with the support extending through the cavity. The guide is attached to the vane assembly and extending across the cavity.

In a further embodiment of any of the foregoing gas turbine engine assemblies, the guide includes a bracket including a bore for receiving the cylindrical portion of the retaining nut.

In a further embodiment of any of the foregoing gas turbine engine assemblies, includes a bearing assembly supported by the supports extending through the cavity in the vane assembly.

A mid-turbine frame for a gas turbine engine according to an exemplary embodiment of this disclosure, among other possible things includes a case portion, a vane assembly supported within the case portion for directing core airflow between a first turbine and a second turbine, a support rod extending through the vane assembly, a retaining nut attached to the support rod and secured to the an outer surface of the case portion, and a guide attached to the vane assembly and receiving a portion of the retaining nut for aligning the vane assembly relative to the case portion.

In a further embodiment of any of the foregoing mid-turbine frames, the guide includes a bore. The retaining nut includes a cylindrical portion extending from a flange with an outer surface of the cylindrical portion received within the bore.

In a further embodiment of any of the foregoing mid-turbine frames, includes an airfoil and a cavity through the airfoil with the bore disposed over the cavity and the support rod extending through the cavity.

In a further embodiment of any of the foregoing mid-turbine frames, the guide includes a bracket attached to the vane.

In a further embodiment of any of the foregoing mid-turbine frames, the support rod includes a radially inner flange for supporting a bearing structure radially inward of the vane assembly.

In a further embodiment of any of the foregoing mid-turbine frames, includes a bushing disposed within the bore for defining a running fit with the outer surface of the retaining nut.

In a further embodiment of any of the foregoing mid-turbine frames, the guide is formed as part of the vane assembly.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
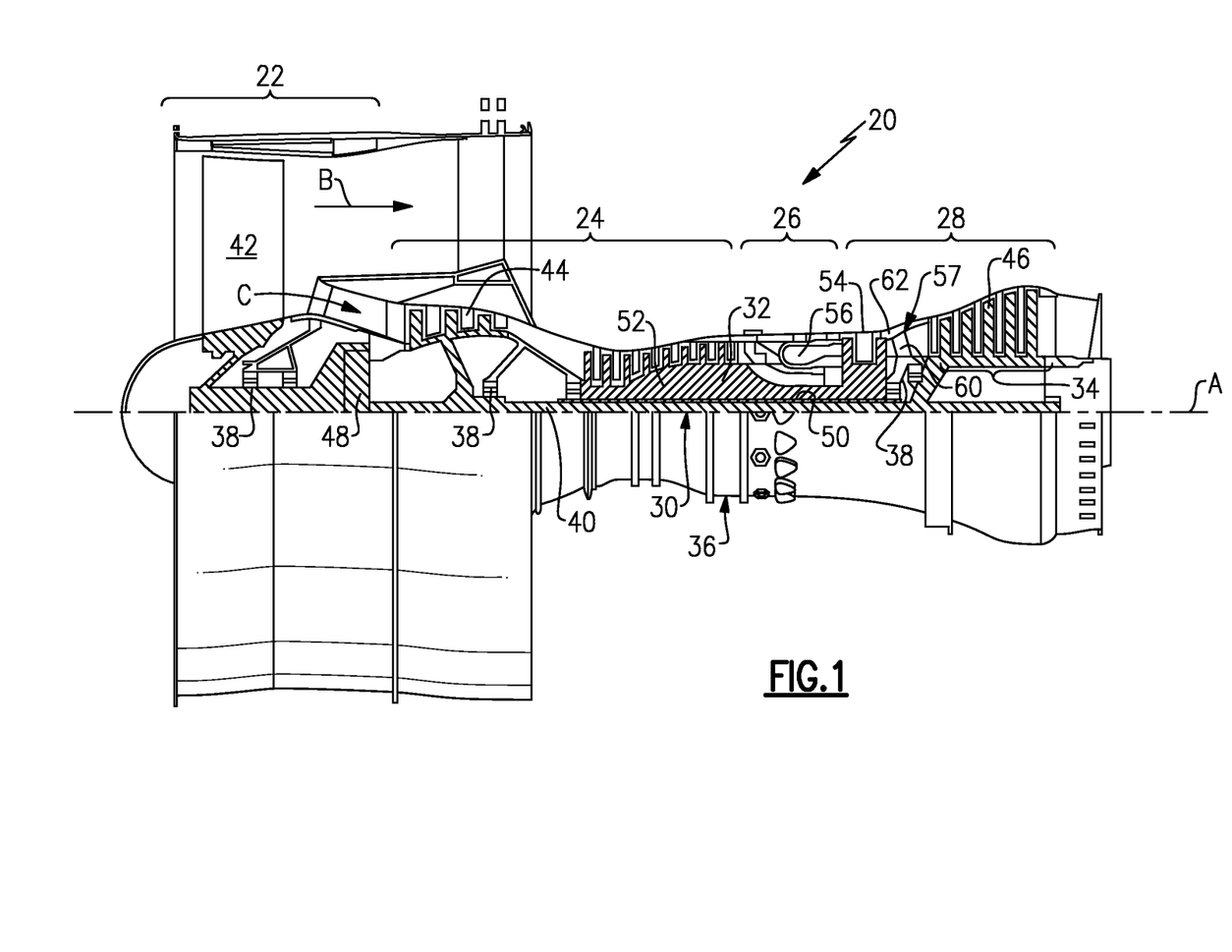
FIG. 1 is a schematic view of an example gas turbine engine.

FIG. 1 schematically illustrates an example gas turbine engine 20 that includes a fan section 22, a compressor section 24, a combustor section 26 and a turbine section 28. Alternative engines might include an augmenter section (not shown) among other systems or features. The fan section 22 drives air along a bypass flow path B while the compressor section 24 draws air in along a core flow path C where air is compressed and communicated to a combustor section 26. In the combustor section 26, air is mixed with fuel and ignited to generate a high pressure exhaust gas stream that expands through the turbine section 28 where energy is extracted and utilized to drive the fan section 22 and the compressor section 24.

Although the disclosed non-limiting embodiment depicts a turbofan gas turbine engine, it should be understood that the concepts described herein are not limited to use with turbofans as the teachings may be applied to other types of turbine engines; for example a turbine engine including a three-spool architecture in which three spools concentrically rotate about a common axis and where a low spool enables a low pressure turbine to drive a fan via a gearbox, an intermediate spool that enables an intermediate pressure turbine to drive a first compressor of the compressor section, and a high spool that enables a high pressure turbine to drive a high pressure compressor of the compressor section.

The example engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that connects a fan 42 and a low pressure (or first) compressor section 44 to a low pressure (or first) turbine section 46. The inner shaft 40 drives the fan 42 through a speed change device, such as a geared architecture 48, to drive the fan 42 at a lower speed than the low speed spool 30. The high-speed spool 32 includes an outer shaft 50 that interconnects a high pressure (or second) compressor section 52 and a high pressure (or second) turbine section 54. The inner shaft 40 and the outer shaft 50 are concentric and rotate via the bearing systems 38 about the engine central longitudinal axis A.

A combustor 56 is arranged between the high pressure compressor 52 and the high pressure turbine 54. In one example, the high pressure turbine 54 includes at least two stages to provide a double stage high pressure turbine 54. In another example, the high pressure turbine 54 includes only a single stage. As used herein, a "high pressure" compressor or turbine experiences a higher pressure than a corresponding "low pressure" compressor or turbine.

The example low pressure turbine 46 has a pressure ratio that is greater than about 5. The pressure ratio of the example low pressure turbine 46 is measured prior to an inlet of the low pressure turbine 46 as related to the pressure measured at the outlet of the low pressure turbine 46 prior to an exhaust nozzle.

A mid-turbine frame 58 of the engine static structure 36 is arranged generally between the high pressure turbine 54 and the low pressure turbine 46. The mid-turbine frame 58 further supports bearing systems 38 in the turbine section 28 as well as setting airflow entering the low pressure turbine 46.

Airflow through the core airflow path C is compressed by the low pressure compressor 44 then by the high pressure compressor 52 mixed with fuel and ignited in the combustor 56 to produce high speed exhaust gases that are then expanded through the high pressure turbine 54 and low pressure turbine 46. The mid-turbine frame 58 includes vanes 60, which are in the core airflow path and function as an inlet guide vane for the low pressure turbine 46. Utilizing the vane 60 of the mid-turbine frame 58 as the inlet guide vane for low pressure turbine 46 decreases the length of the low pressure turbine 46 without increasing the axial length of the mid-turbine frame 58. Reducing or eliminating the number of vanes in the low pressure turbine 46 shortens the axial length of the turbine section 28. Thus, the compactness of the gas turbine engine 20 is increased and a higher power density may be achieved.

The disclosed gas turbine engine 20 in one example is a high-bypass geared aircraft engine. In a further example, the gas turbine engine 20 includes a bypass ratio greater than about six (6), with an example embodiment being greater than about ten (10). The example geared architecture 48 is an epicyclical gear train, such as a planetary gear system, star gear system or other known gear system, with a gear reduction ratio of greater than about 2.3.

In one disclosed embodiment, the gas turbine engine 20 includes a bypass ratio greater than about ten (10:1) and the fan diameter is significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft., with the engine at its best fuel consumption—also known as "bucket cruise Thrust Specific Fuel Consumption ('TSFC')"—is the industry standard parameter of pound-mass (lbm) of fuel per hour being burned divided by pound-force (lbf) of thrust the engine produces at that minimum point.

"Low fan pressure ratio" is the pressure ratio across the fan blade alone, without a Fan Exit Guide Vane ("FEGV") system. The low fan pressure ratio as disclosed herein according to one non-limiting embodiment is less than about 1.50. In another non-limiting embodiment the low fan pressure ratio is less than about 1.45.

"Low corrected fan tip speed" is the actual fan tip speed in ft/sec divided by an industry standard temperature correction of $[(Tram\ °R)/(518.7°\ R)]^{0.5}$. The "Low corrected fan tip speed", as disclosed herein according to one non-limiting embodiment, is less than about 1150 ft/second.

The example gas turbine engine includes the fan 42 that comprises in one non-limiting embodiment less than about 26 fan blades. In another non-limiting embodiment, the fan section 22 includes less than about 20 fan blades. Moreover, in one disclosed embodiment the low pressure turbine 46 includes no more than about 6 turbine rotors schematically indicated at 34. In another non-limiting example embodiment the low pressure turbine 46 includes about 3 turbine rotors. A ratio between the number of fan blades 42 and the number of low pressure turbine rotors is between about 3.3 and about 8.6. The example low pressure turbine 46 provides the driving power to rotate the fan section 22 and therefore the relationship between the number of turbine rotors 34 in the low pressure turbine 46 and the number of blades 42 in the fan section 22 disclose an example gas turbine engine 20 with increased power transfer efficiency.

Figure 2:
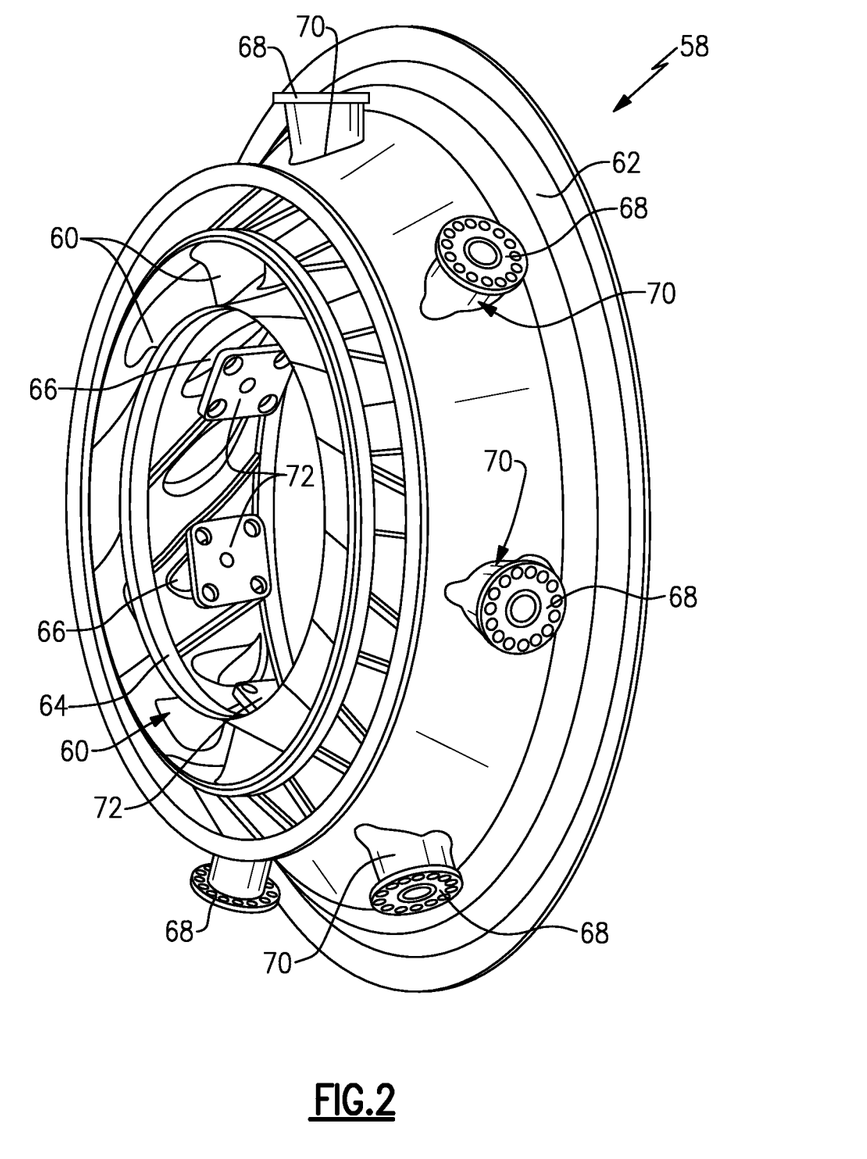
FIG. 2 is a perspective view of an example case structure for the gas turbine engine.

Referring to FIG. 2 with continued reference to FIG. 1, the example mid turbine frame 58 includes an intermediate case 62. The intermediate case 62 is disposed between a case that surrounds the high pressure turbine 54 and a case for the low pressure turbine 46. In this example, the mid turbine frame 58 is disposed within the intermediate case 62, however the mid turbine frame 58 may also be supported within other case structures and configurations as may be utilized within a gas turbine engine.

The example mid turbine frame 58 includes a vane assembly 64 that is supported within the case 62. The example vane assembly 64 includes a plurality of airfoils 60 that are disposed annularly within the case 62.

A plurality of I-rods or support rods 66 extend through cavities 74 defined through the vane assembly 64. Each of the support rods 66 are mounted to an exterior part of the case 62 by way of a retaining nut 68. The support rods 66 also include a radially, inwardly facing flange 72 utilized for supporting a bearing assembly 38 of the gas turbine engine 20. As appreciated, the bearing assembly supported by the support rods 66 is utilized to support rotation of the outer shaft 50 and the inner shaft 40.

The retaining nut 68 is attached to a boss 70 defined at specific locations about an external surface of the case 62.

Figure 3:
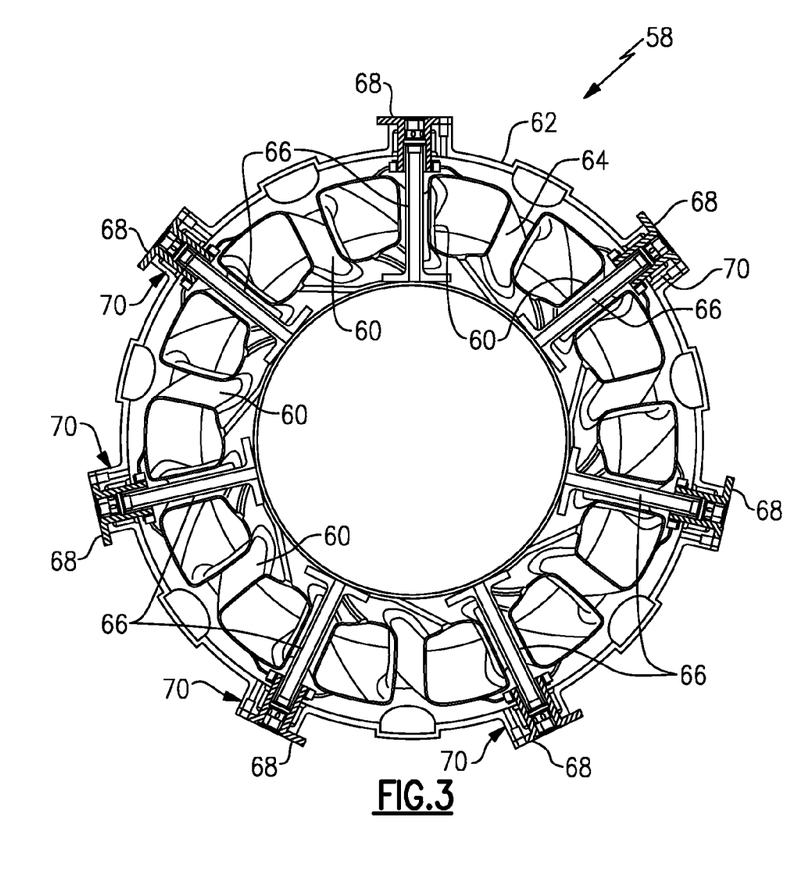
FIG. 3 is a sectional view of an example mid turbine frame.
Figure 4:
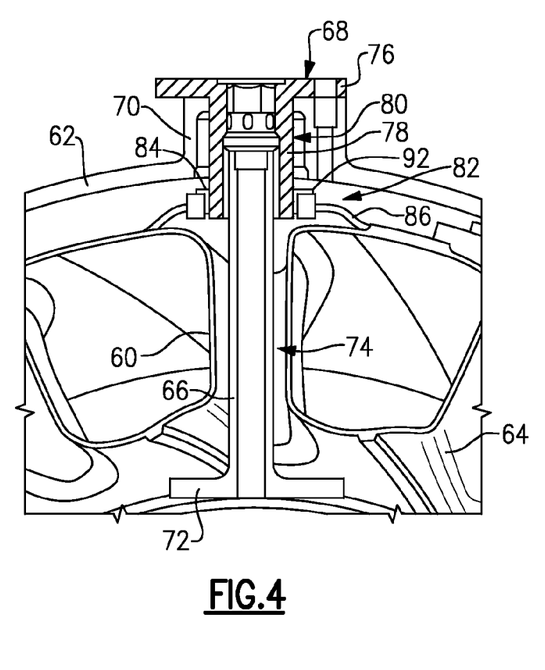
FIG. 4 is a sectional view of a portion of the mid turbine frame.
Figure 5:
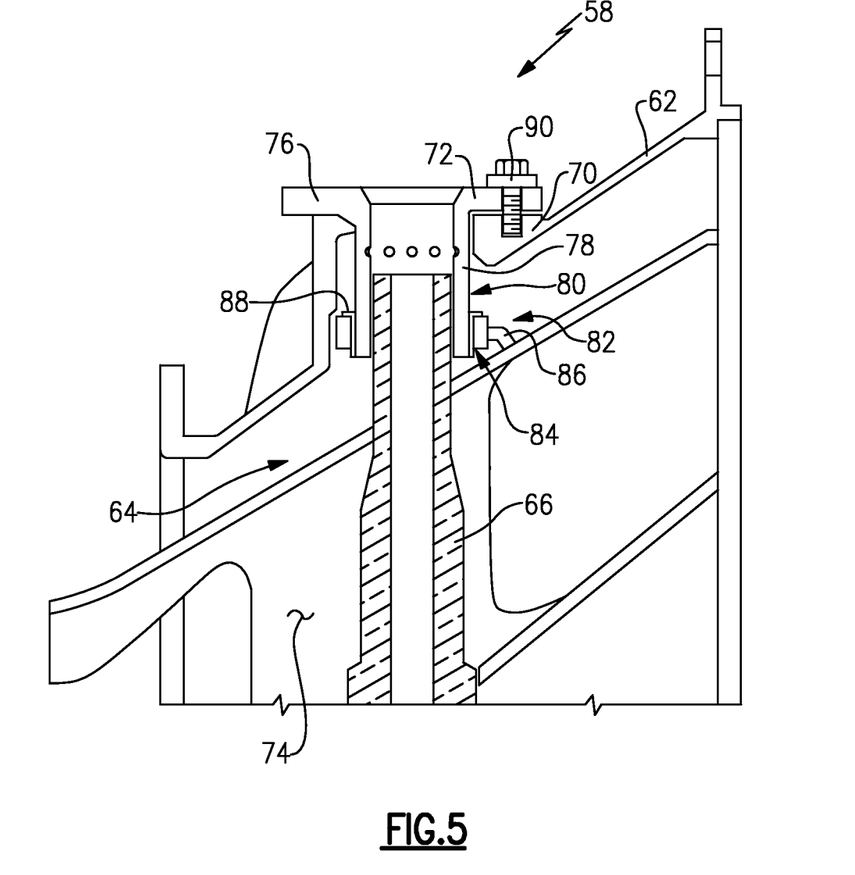
FIG. 5 is another cross-sectional view of a portion of the mid turbine frame.

Referring to FIGS. 3, 4, and 5, the example mid turbine frame 58 includes features for maintaining a desired alignment between the vane assembly 64 and case 62. As appreciated, the vane assembly 64 is disposed within the case 62 and a desired axial and radial alignment is maintained between the vane assembly 64 and the case 62. In this example, the support rods 66 extend through cavities 74 defined through the vane assembly 64. The cavities 74 are defined through airfoils 60 of the vane assembly 64.

The support rod 66 is threaded into the retaining nut 68. The retaining nut 68 is in turn attached to the boss 70 disposed on the outer surface of the case 62. The retaining nut 68 is held to the boss 70 by way of a threaded fastener 90 (FIG. 5). A guide 82 is mounted to the vane assembly 64 and receives a portion of the retaining nut 68. The guide 82 receives a portion of the retaining nut 68 to maintain a relative alignment between the case 62 and the vane assembly 64.

In this example, the retaining nut 68 includes a flange 76 and a cylindrical portion 78 extending from that flange 76. The cylindrical portion 78 includes an external surface 80 that is received within a bore 84 defined by the guide 82.

The cylindrical portion 78 of the retaining nut 68 rides within the bore 84 defined by the guide 82. In this example, a bushing 88 (FIG. 5) is disposed within the bore 84 to define a running clearance fit between the cylindrical portion 78 of the retaining nut 68 and the guide 82. The running fit orientation between the retaining nut 68 and the guide 82 provides for the retention of the vane assembly 64 within a relative axial and radial alignment relative to the case 62.

In previous vane alignment configurations, separate alignment pins were disposed about the outer structure of the case 62 to engage surfaces of the vane assembly 64. These extra alignment pins required additional boss structures to be defined on the case 62 along with the use of additional fasteners to attach the pins to the case 62. The example guide 82 comprises a bracket having legs 86 to support the bore 84 across the cavity 74 such that the retaining nut 68 is utilized as a guide to orientate and support the vane assembly 64.

The retaining nut 68 includes the outer surface 80 that is of a size defined to be received within the bore 84. Accordingly, the retaining nut 68 provides the alignment required between the vane assembly 64 and the case 62.

Figure 6:
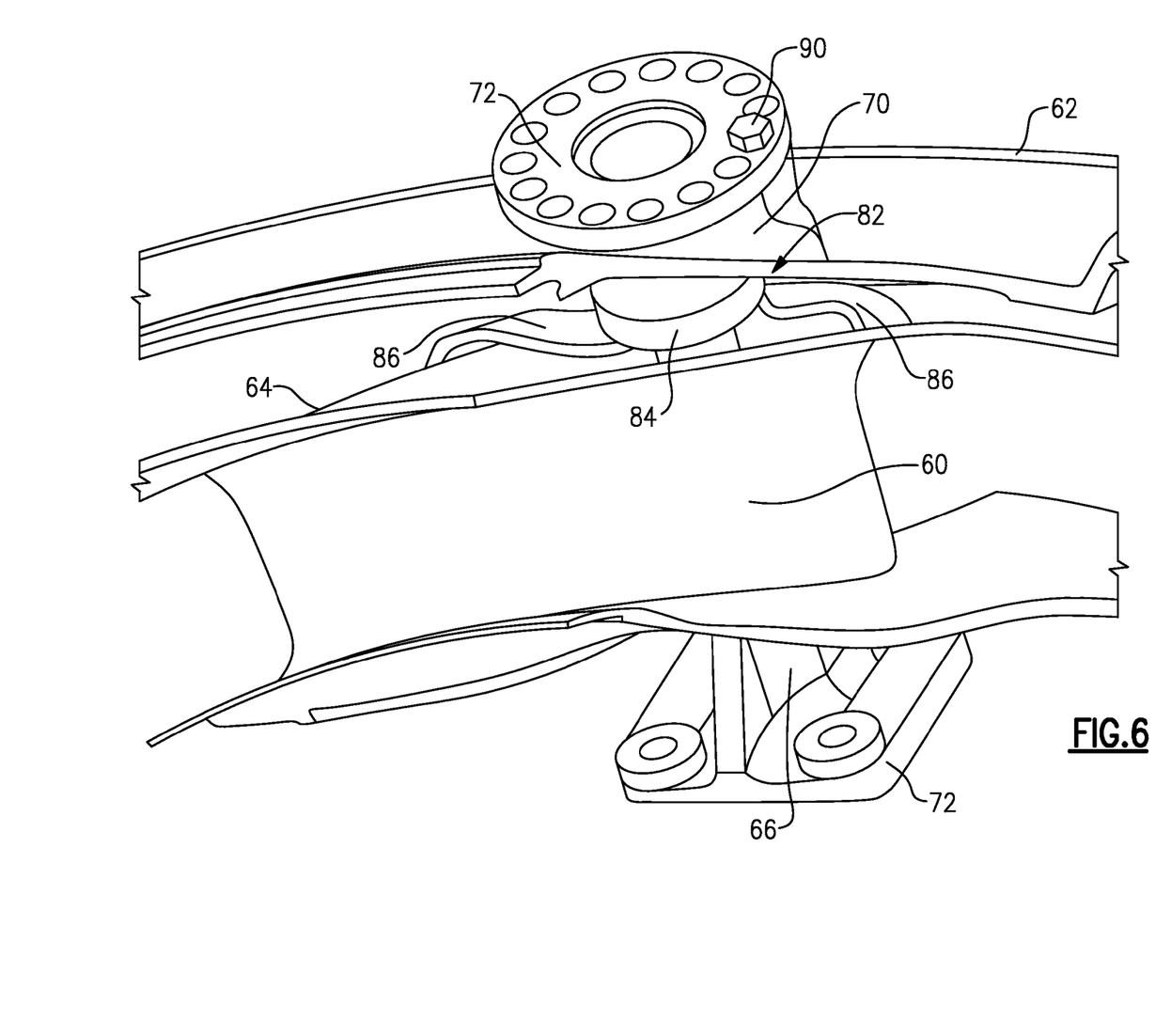
FIG. 6 is a perspective view of an example vane and retaining nut of the mid turbine frame.
Figure 7:
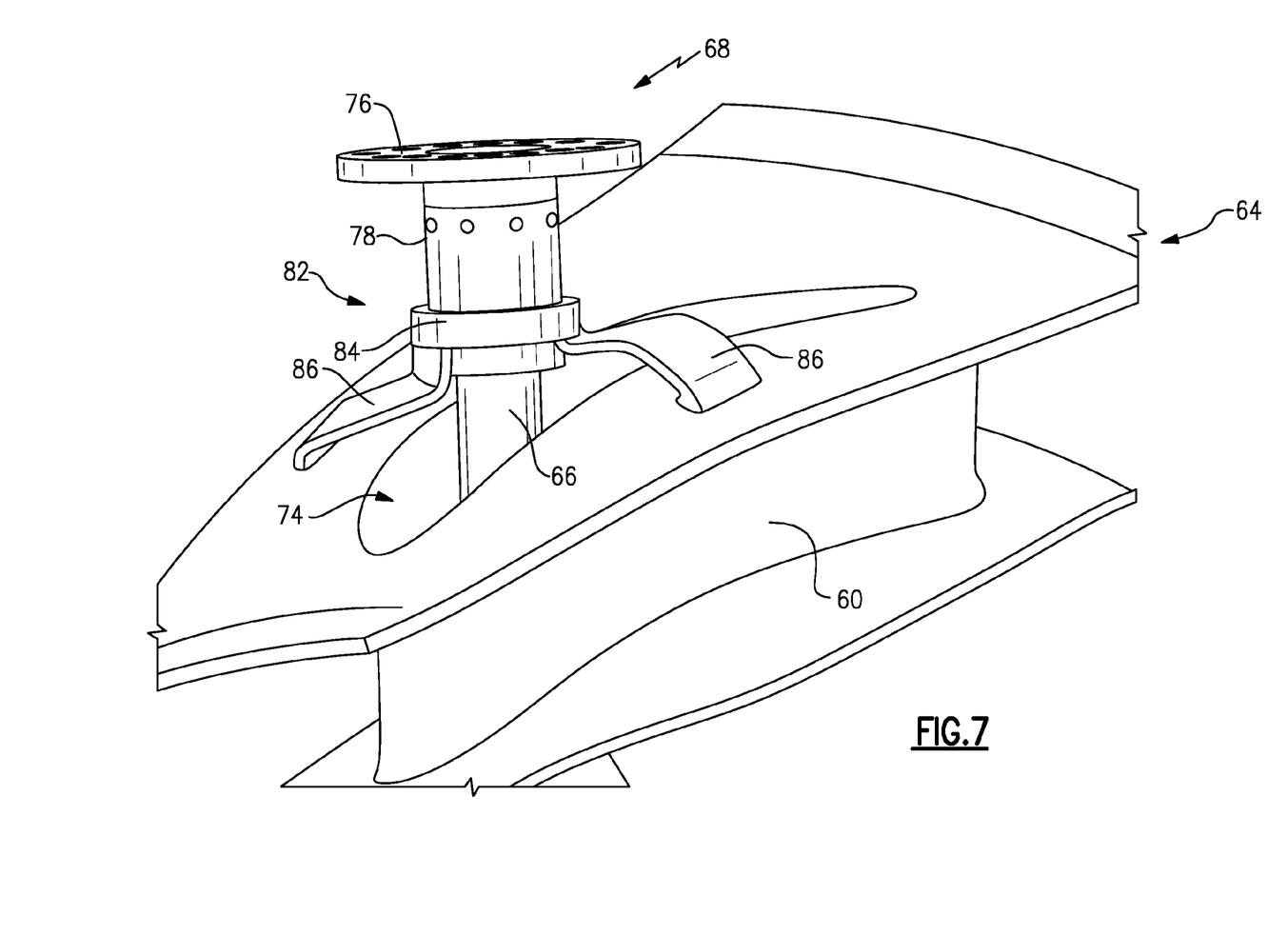
FIG. 7 is a perspective view of the vane assembly and retaining nut of the mid turbine assembly.

Referring to FIGS. 5, 6, and 7, the example guide 82 includes the bore 84 that is suspended over the cavity 74 through which the support rod 66 extends. The retaining nut 68 is then engaged through a threaded interface to the support rod 66 and extends inwardly from an outer surface of the case 62. A cylindrical portion 78 of the retaining nut 68 is received within the bore 84 of the guide 82 to maintain the axial and radial alignment of the vane assembly 64.

In this example, the guide 82 includes legs 86 that support the bore 84 across the opening or cavity 74 for the corresponding support rod 66. The cylindrical portion 78 of the retaining nut 68 extends downwardly through the case 62 and is received within the bore 84 to provide the guiding alignment there between.

The vane assembly 64 and the case 62 operate at different temperatures and therefore during thermal expansion during operation there is a relative thermal movement between the vane assembly 64 and the case structure 62. Accordingly, the outer surface 80 of the retaining nut 68 provides a running fit with the bore 84 defined by the guide 82. The running fit allows for relative movement due to thermal differences in the case 62 and the vane structure 64.

Accordingly, the example mid turbine frame includes features that provide for alignment between the vane assembly 64 and case 62 without the additional guide pins and align pins included and mounted to the outer case 62. Therefore, the example mid turbine frame 58 utilized reduces the number of parts and structures required on the case while still providing the desired axial and radial alignment between the case 62 and the vane assembly 64.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A gas turbine engine assembly comprising:
   an engine case;
   a first turbine supported for rotation about an engine axis;
   a second turbine spaced axially apart from the first turbine and rotatable about the engine axis;
   a vane assembly supported within the engine case between the first turbine and the second turbine, the vane assembly including a cavity extending through the vane assembly;
   a support extending through the cavity in the vane assembly;
   a retention nut attached to the support and secured to the engine case, the retention nut including a flange and a cylindrical portion extending radially inward, the cylindrical portion having an internally threaded bore, the flange secured to the engine case;
   a guide including legs and a bore, the legs support the bore across the cavity, the bore receiving the cylindrical portion of the retention nut such that the vane assembly is movable relative to the engine case.

2. The gas turbine engine assembly as recited in claim 1, wherein an outer surface of the cylindrical portion guides along an inner surface of the bore.

3. The gas turbine engine assembly as recited in claim 1, wherein the flange is secured to an outer surface of the engine case with a threaded fastener.

4. The gas turbine engine assembly as recited in claim 1, wherein the guide comprises a bracket attached to the vane assembly.

5. The gas turbine engine assembly as recited in claim 1, including a bearing assembly supported by the support extending through the cavity in the vane assembly.

6. A mid-turbine frame for a gas turbine engine comprising:

a case portion;

a vane assembly supported within the case portion for directing core airflow between a first turbine and a second turbine;

a support rod extending through the vane assembly, the support rod including external threads;

a retaining nut including a flange and a cylindrical portion defining internal threads engaged to the external threads of the support rod, the flange secured to an outer surface of the case portion;

a guide attached to the vane assembly, the guide including a bore receiving the cylindrical portion of the retaining nut for aligning the vane assembly relative to the case portion such that the vane assembly is movable relative to the case responsive to relative thermal movement between the vane assembly and the case portion; and a bushing disposed within the bore for defining a running fit with an outer surface of the cylindrical portion of the retaining nut.

7. The mid-turbine frame as recited in claim 6, wherein the vane assembly includes an airfoil and a cavity through the airfoil with the bore disposed over the cavity and the support rod extending through the cavity.

8. The mid-turbine frame as recited in claim 6, wherein the guide comprises a bracket attached to the vane.

9. The mid-turbine frame as recited in claim 6, wherein the support rod includes a radially inner flange for supporting a bearing structure radially inward of the vane assembly.

10. The mid-turbine frame as recited in claim 6, wherein the guide is formed as part of the vane assembly and is movable with the vane assembly relative to the case portion to accommodate relative thermal movement.

* * * * *